United States Patent [19]
Barton et al.

[11] Patent Number: 6,047,316
[45] Date of Patent: Apr. 4, 2000

[54] MULTIPROCESSOR COMPUTING APPARATUS HAVING SPIN LOCK FAIRNESS

[75] Inventors: Richard R. Barton, Lexington; Arthur F. Cochcroft, Jr., West Columbia, both of S.C.; Edward A. McDonald, Baton Rouge, La.; Robert J. Miller, Columbia, S.C.; Byron L. Reams; Roy M. Stevens, both of Lexington, S.C.; Billy K. Taylor, Columbia, S.C.

[73] Assignee: INTEL Corporation, Santa Clara, Calif.

[21] Appl. No.: 08/989,617

[22] Filed: Dec. 12, 1997

[51] Int. Cl.$^7$ .................................................. G06F 12/00
[52] U.S. Cl. ............................................................. 709/216
[58] Field of Search ........................ 364/DIG. 1, DIG. 2; 395/200.3, 200.31, 200.43, 200.44, 200.46, 200.47, 200.48, 113, 119, 145, 147, 148, 150, 151; 711/130, 151; 709/200, 201, 213, 214, 216, 217, 218

[56] References Cited

U.S. PATENT DOCUMENTS

| | | | |
|---|---|---|---|
| 4,426,681 | 1/1984 | Bacot et al. | 711/130 |
| 4,594,657 | 6/1986 | Byrns | 364/200 |
| 5,050,072 | 9/1991 | Earnshaw et al. | 364/200 |
| 5,241,676 | 8/1993 | Kubo | 395/650 |
| 5,339,443 | 8/1994 | Lockwood | 395/725 |
| 5,463,741 | 10/1995 | Levenstein | 395/299 |
| 5,548,780 | 8/1996 | Krein | 395/825 |
| 5,586,318 | 12/1996 | Toutonghi | 395/677 |
| 5,727,150 | 3/1998 | Laudon et al. | 395/200.45 |
| 5,860,159 | 1/1999 | Hagersten | 711/151 |

*Primary Examiner*—Robert B. Harrell
*Attorney, Agent, or Firm*—Blakely, Sokoloff, Taylor & Zafman LLP

[57] ABSTRACT

A multiprocessor computing apparatus that includes a mechanism for favoring at least one processor over another processor to achieve more equitable access to cached data. Logic for detecting when, for example, a remote and a local processor are attempting to access data from the cache of another local processor is disclosed. Logic that provides an advantage to the remote processor in a manner that achieves fairer access among the various processors is also disclosed.

17 Claims, 2 Drawing Sheets

MULTIPROCESSOR COMPUTING APPARATUS HAVING SPIN LOCK FAIRNESS

FIELD OF THE INVENTION

The present invention relates to multiple processor computing systems and more specifically to providing the processors in such systems with generally fair access to shared data structures and system resources.

BACKGROUND OF THE INVENTION

In multiple processor or "multiprocessor" (MP) computers, it is sometimes necessary to ensure that one of the processors has exclusive access to a data structure or system resource for a period of time. This is typically achieved by using a software locking or latching technique such as a semaphore.

A test-and-set primitive may be implemented in hardware that supports the software latching technique. A test-and-set primitive permits software to read a variable (of a data structure), compare it in some way and write back a result based on the comparison, in an indivisible and uninterrupted fashion with respect to other system processors.

Since semaphore and like latched variables are inherently shared, access to them in a MP system can consume a lot of memory band width and processor time in looping on unavailable variables.

These variables also tend to spend a significant amount of time being moved from the cache of one processor to the cache of another. This is particularly true when the test-and-set hardware primitive is used to test the status of the semaphore, since the primitive involves a write operation which will cause cache ownership and therefore data exchange between the testing processor and the processor with the more current cached copy of the data. A software technique of minimizing band width utilization is the "spin lock" and an example of this technique is as follows. If a hardware test-and-set primitive is utilized for an initial test and the variable under test is currently owned by another processor, then the software loops on reading the variable until it becomes free, hence "spinning." This spinning occurs inside the cache and thus reduces impact on system resources such as memory bandwidth. After the variable becomes free, the test-and-set operation is used in an attempt to gain ownership of the variable, hence "locking."

The spin lock technique, however, has dis-advantageous aspects. One disadvantageous aspect is that in a multiprocessor system, several of the processors may desire the same variable and simultaneously institute a spin lock for ownership. When the processor that is currently accessing the variable finishes, each processor that is spinning on the variable tries to lock onto it, creating a "thundering herd" scenario. A thundering herd situation is particularly disadvantageous when one processor has an advantage in gaining access to a variable over another processor, for example, due to system architecture, such as location on a bus, or other reasons.

With respect to uneven placement on a bus, in this situation one processor may be more likely to lock onto a variable than another, resulting in uneven access and the degradation or suspension of operations in the disadvantaged processor. This positional favoritism might arise in a MP computing system such as that shown in FIG. 1 which utilizes a bus hierarchy with a multiplicity of local busses interconnected by a system bus. A processor in the left-hand cluster of processors has an advantage over processors in the right-hand cluster of processors when attempting to access a semaphore in the left-hand cluster. It should also be recognized that system architecture such as that of FIG. 1 (tiered busses) are gaining popularity over system architectures that use a single shared bus, due to the physical and electrical limitations associated with putting many processors on a single shared bus. The move in the art towards system architecture such as those discussed below further increases the significance of the present invention.

SUMMARY OF THE INVENTION

Accordingly, it is an object of the present invention to provide a multiprocessor computing system having a mechanism for fairly allocating resources among competing computers.

It is another object of the present invention to provide spin lock fairness in such a system.

It is also an object of the present invention to provide spin lock fairness in a multiprocessor computing system having a distributed or multi-level bus interconnect.

These and related objects of the present invention are achieved by use of a multiprocessor computing apparatus having spin lock fairness as described herein.

In one embodiment, the present invention includes a plurality of processors each having a cache memory, said plurality of processors being intercoupled via a bus structure, logic that permits said processors to access data in the cache memory of another of said plurality of processors; logic coupled to said processors and said bus structure that detects when at least one of said processors is attempting to access data in the cache memory of another of said processors; and logic coupled to said detection logic that provides an advantage to at least one processor over other processors in said plurality for obtaining access to the data in the desired processor's cache memory. The percentage of times said advantage is provided by said logic may be programmable and preferably achieves substantial fair access among competing ones of said plurality of processors to data within the cache memories of the plurality of processors. The advantage may include denying access to other processors for a defined time period, thereby permitting a favored processor to attain access to the desired data in said time period.

Another embodiment of the present invention includes a local plurality of processors each having a cache memory; a remote plurality of processors each having a cache memory, said local plurality and said remote plurality being intercoupled by a bus structure; logic coupled to said bus structure that detects when one of said remote processors is attempting to access data in the cache memory of one of said local processors; and logic coupled to said detection logic that provides an advantage to said remote processor over other local processors in attaining access to the data in the desired local processor's cache memory. Said advantage may be as described in the paragraph above.

The attainment of the foregoing and related advantages and features of the invention should be more readily apparent to those skilled in the art, after review of the following more detailed description of the invention taken together with the drawings.

DETAILED DESCRIPTION

Although the text that follows describes the present invention in a symmetric multiprocessing system, it should be clearly understood that this is by way of illustration only. Those skilled in the art will understand that the principles of the present invention may readily be incorporated in a wide variety of multiprocessor systems, including but not limited to non-uniform memory access (NUMA), replicated memory cluster (RMC), cache coherent NUMA (CC-NUMA), massively parallel processing (MPP), and other like systems, in order to improve performance.

Figure 1:
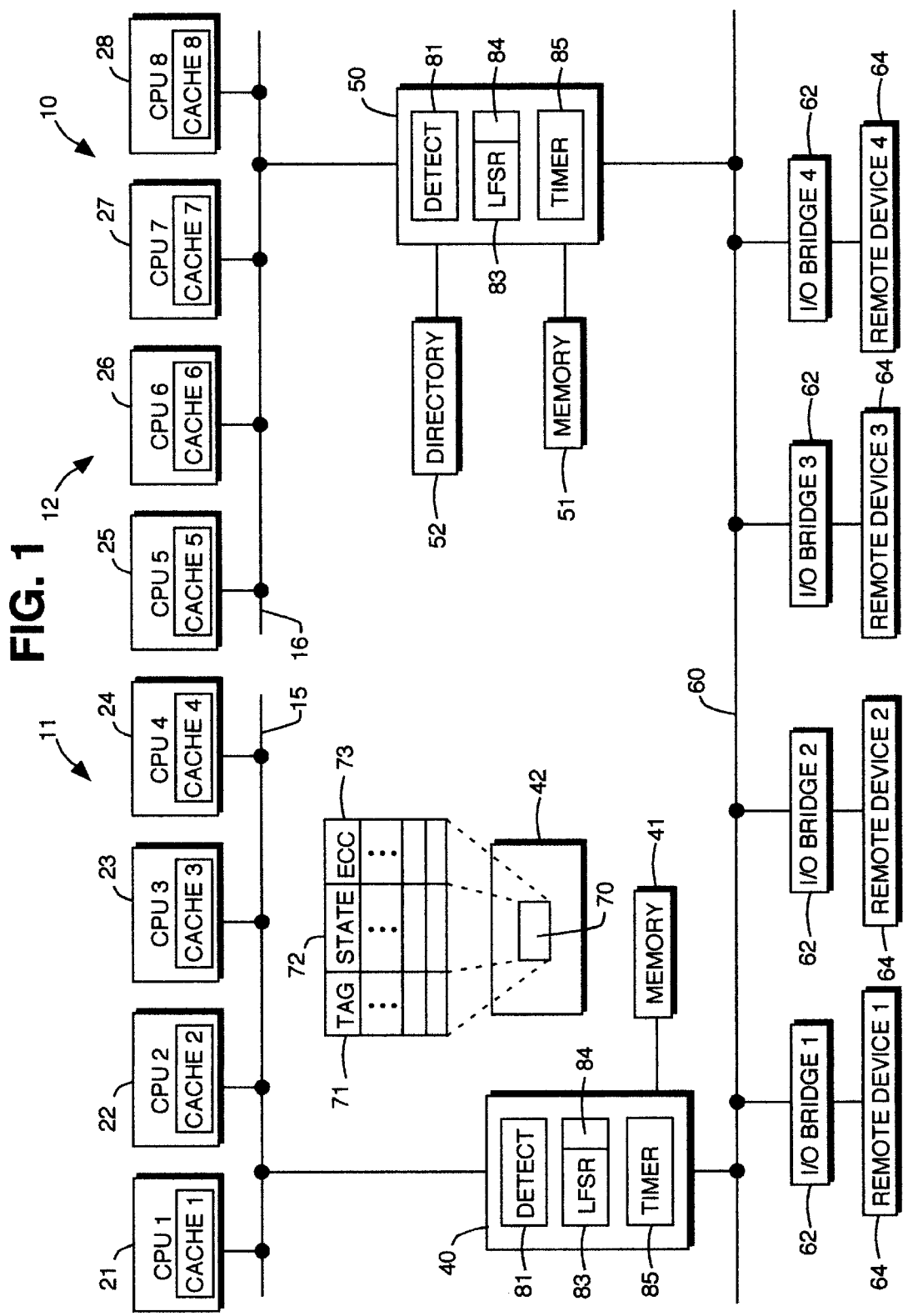
FIG. 1 is a block diagram of a multiple processor computing system having spinlock fairness in accordance with the present invention.

Referring to FIG. 1, a block diagram of a multiple processor computing system 10 in accordance with the present invention is shown. As indicated above, system 10 illustrates a representative embodiment of a system in which the present invention may be implemented. The present invention is not limited to such systems. System 10 includes a multiplicity of processors (eight in the representative embodiment of FIG. 1) 21–28. A first subset of four processors 21–24 is connected to a first local bus 15 and a first memory controller 40, while a second subset of four processors 25–28 is connected to a second local bus 16 and a second memory controller 50. In a preferred embodiment, the processors are Intel Pentium Pro™ processors, while the local busses are Intel P6 busses.

Each memory controller 40,50 is connected to a local fast access memory (normally DRAM) 41,51 and a coherency directory 42,52, respectively. Each coherency directory preferably includes a memory line status table (MLST) 70 which includes a physical address tag 71, a status 72 and an ECC entry 73 for each cache line. Only the MLST of coherency directory 42 is shown, though it is to be understood that a similar table exists in coherency directory 52. The combination of a memory controller and its local memory, coherency directory and subset of processors may be referred to as a node (i.e., first node 11, second node 12, etc.). The memory controllers and the nodes in which they are located are interconnected by a system bus 60.

System bus 60 provides both communication between nodes and communication between a node and an external/remote device. The external/remote devices may be PCI, ISA and EISA devices 64 and the like, such as mass storage devices and Ethernet connections, and they are coupled to system bus 60 through I/O bridges 62. Suitable system bus architectures and the connection of peripheral devices are generally known in the art. In a preferred embodiment, the system bus comprises the Intel PCI I/O chipset and is implemented using the Pentium Pro bus topology.

Memory controller 40,50 controls the transfer of data between a processor and local memory, a processor and a device connected through an I/O bridge and a processor and a remote memory (for example, between processor 22 and memory 51). Amongst other componentry, each memory controller 40,50 contains a local bus interface, a system bus interface, control logic, and coherency directory interface and test logic. U.S. patent application Ser. No. 08/760,126, entitled COMPUTER SYSTEM INCLUDING MULTIPLE SNOOPED, MULTIPLE MASTERED SYSTEM BUSSES AND METHOD FOR INTERCONNECTING SAID BUSSES and filed on Dec. 3, 1996, discloses a suitable memory controller, though other memory control devices that achieve control of local and remote memory data transmissions are known in the art. Application Ser. No. 08/760,126 is commonly assigned to the assignee of the present application and is hereby incorporated by reference as if fully set forth herein.

Memory controller 40,50 also preferably contains remote spinlock comparator logic 81, a linear feedback shift register (LFSR) 83 for use in remote versus local favoritism and a timer 85 that provides a period or "duration" during which a remote processor is favored over a local processor for acquiring semaphore ownership. The function of these components is described in more detail below with reference to FIG. 2.

Spinlock Operation

Each of processors 21–28 contain a cache memory, designated cache 1—cache 8, respectfully. The control of cache lines is preferably implemented using MESI cache coherency protocol. Typical semaphore acquisition instruments include test and set (TAS) and compare and swap (CAS) primitives and the like.

As alluded to in the Background of the Invention, the architecture of system 10 and other distributed architectures may create a situation in which processors from both node 1 and 2 are executing spinlocks for a semaphore currently owned, for example, by another processor in node 1. Due to their physical proximity (on a single share bus), the processors in node 1 have an advantage in gaining semaphore ownership. (The converse is true when a semaphore is owned by a processor in node 2). The present invention induces favoritism by preferably detecting when a "thundering herd" involving a remote processor is occurring (or at least when a remote processor is spinlocked on a particular semaphore) and in a certain percentage of cases providing the remote processor a non-competitive time period to attempt to attain ownership. In a preferred embodiment, the remote processor is favored approximately 50% of the time, though depending on system applications this percentage may be determined empirically or otherwise to be different.

Figure 2:
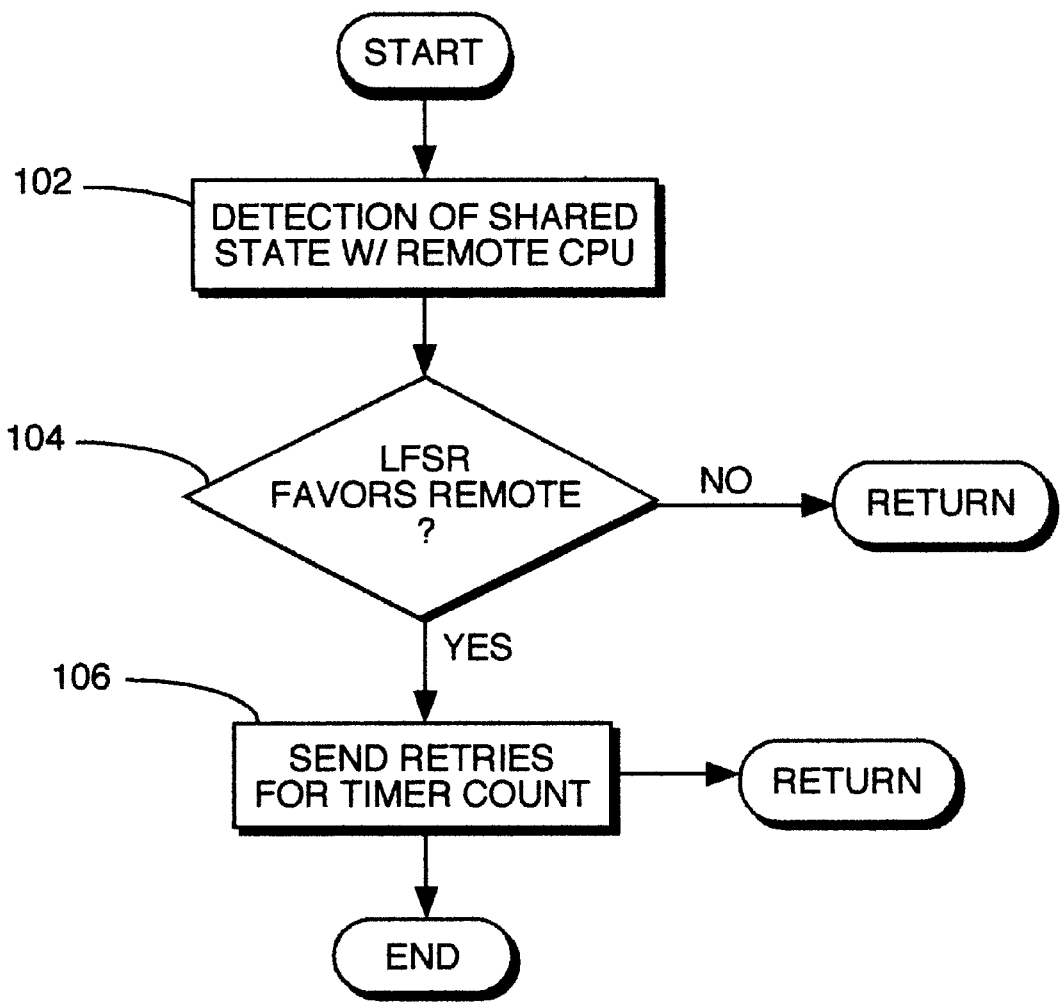
FIG. 2 is a flow diagram for implementing spinlock fairness in accordance with the present invention.

Referring to FIG. 2, a flow diagram for implementing spinlock fairness in accordance with the present invention is shown. The fairness determination procedure is entered when (1) a processor that currently has control of a cache line issues a read for ownership (RFO) of that line (to write to the line during that processor's attempt to release the line) and (2) the status field 72 for that cache line indicates that the line is shared with at least one remote processor (step 102). This determination is preferably made by comparator logic 81 within the memory controller that has access to MLST 70 and snoops the local bus for RFOs. Though logic 81 may be implemented using different technology such as software of programmable logic arrays and the like, logic 81, LFSR 83 and timer 85 are preferably implemented in hardware in an application specific integrated circuit (ASIC).

In step 104, a determinative bit 84 in LFSR 83 is interrogated to determine if ownership preference is to be given to the remote processor(s). LFSR 83 is preferably a pseudo-random number generator that generates a sequence of 1s and 0s. A 1 in bit position 84 indicates ownership preference to remote processor(s), while a 0 at bit 84 does not. The percentage of 1s generated by LFSR 83 is preferably set to a value that enhances system performance.

Preference to a remote processor is achieved by retrying any local processors' RFO to that line for a defined period of time. P6 bus protocol permits memory controller 40 or 50 to tell a local processor to retry its RFO. The command to retry is sent to all local processor that have submitted RFOs for the defined time period. A programmable timer 85 is utilized for establishing the desired time delay. The period of delay can be determined empirically and parameters for appropriate delay selection include that the delay should be sufficient to provide a remote processor with adequate time to issue a successful RFO, while not being sufficiently long that system performance is degraded by undesirable delay under normal non-spinlock conditions.

When bit 84 is 0 in step 104, local processors are not sent a retry command.

Step 106 indicates activation of delay time 85. At the expiration of the count, the remote favoritism is terminated and the local processor(s) may now be allowed to complete an RFO for the particular line. If the time delay is adequate and other system parameters are operating appropriately, the remote processor should have already gained ownership of the semaphore by the time a local processor is allowed to complete an RFO.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. An apparatus comprising:

first logic to detect when a first processor and a second processor request access to a shared system resource, and said first processor is at a disadvantage for gaining access to the shared system resource compared to the second processor; and second logic to delay access to the shared system resource by the second processor based at least in part on a detection by the first logic.

2. The apparatus of claim 1, wherein said second logic does not delay the second processor for every detection.

3. The apparatus of claim 2, wherein a percentage of times the second processor is delayed in response to a detection by said second logic is programmable.

4. The apparatus of claim 2, wherein said second logic comprises:

a linear feedback shift register to generate a percentage of detections for which the second processor is to be delayed by said second logic; and a timer to time a duration of delayed access to the shared system resource.

5. The apparatus of claim 1, wherein a plurality of processors are distributed along a bus structure, and the first processor is among a first subset of at least one of the plurality of processors and the second processor is among a second subset of at least one the plurality of processors.

6. The apparatus of claim 5, wherein said shared system resource is remote to the first subset on the bus structure and the shared system resource is local to the second subset on the bus structure; and wherein the disadvantage for gaining access is due to remoteness on the bus structure.

7. The apparatus of claim 1, wherein said second logic delays the second processor for a percentage of detections that is intended to achieve substantially fair access between the first and second processors to the shared system resource.

8. The apparatus of claim 1, wherein the shared system resource is a cache memory of one of a plurality of processors coupled to the first and second processors.

9. The apparatus of claim 1, wherein a request to access the shared system resource comprises a spinlock for a semaphore currently owned by the shared system resource.

10. A system comprising:

a local plurality of processors, at least a first local processor of the local plurality of processors having a cache memory;

a remote plurality of processors, said local plurality and said remote plurality being intercoupled by a bus structure;

logic, coupled to said bus structure, to detect when one of said remote processors and a second local processor are attempting to access data in the cache memory of the first local processor; and logic coupled to said logic to detect, to delay access to the cache memory of the first local processor by the second local processor based at least in part on a detection by the logic to detect.

11. The system of claim 10, wherein said logic to delay does not delay the second local processor for every detection.

12. The system of claim 11, wherein a percentage of times the second local processor is delayed by said logic to delay is programmable.

13. The system of claim 10, wherein said logic to delay delays the second local processor for a percentage of detections that is intended to achieve substantially fair access between said local plurality and said remote plurality of processors to data within the cache memories of said local processors.

14. The system of claim 10, wherein an access to particular data in a cache memory comprises attaining ownership of a semaphore for the particular data.

15. The system of claim 10, wherein said delay comprises denying access by the second local processor for a defined time period to permit the one of said remote processors to attain access in said defined time period.

16. The system of claim 10, wherein said logic to delay comprises logic to randomly determine whether or not to delay the second local processor.

17. A method comprising:

detecting when a first processor and a second processor request access to a shared system resource and the first processor is at a disadvantage for gaining access to the shared system resource compared to the second processor; and delaying access to the shared system resource by the second processor based at least in part on the detecting.

* * * * *